US006373890B1

(12) United States Patent
Freeman

(10) Patent No.: US 6,373,890 B1
(45) Date of Patent: Apr. 16, 2002

(54) VIDEO COMPRESSION AND PLAYBACK PROCESS

(75) Inventor: Kyle G. Freeman, Agoura, CA (US)

(73) Assignee: NovaLogic, Inc., Calabasas, CA (US)

(*) Notice: Subject to any disclaimer, the term of this patent is extended or adjusted under 35 U.S.C. 154(b) by 0 days.

(21) Appl. No.: 09/073,368

(22) Filed: May 5, 1998

(51) Int. Cl.[7] ............................................. H04B 1/66
(52) U.S. Cl. ...................... 375/240; 382/239; 382/166; 358/539
(58) Field of Search .................. 375/240; 348/391, 348/384, 420; 382/166

(56) References Cited

U.S. PATENT DOCUMENTS

| 4,319,267 | A |   | 3/1982  | Mitsuya et al. ............... 358/75  |
| 4,580,134 | A |   | 4/1986  | Campbell et al. ........... 340/703 |
| 4,743,959 | A |   | 5/1988  | Frederiksen .................. 358/11  |
| 4,797,729 | A |   | 1/1989  | Tsai ............................ 358/13  |
| 4,816,901 | A |   | 3/1989  | Music et al. .................. 358/13  |
| 4,857,991 | A |   | 8/1989  | Music et al. .................. 358/13  |
| 4,965,754 | A |   | 10/1990 | Stansfield et al. .......... 364/526 |
| 4,965,845 | A |   | 10/1990 | Chan et al. .................... 382/56  |
| 5,046,119 | A | * | 9/1991  | Hoffert et al. .............. 382/166 |
| 5,164,819 | A |   | 11/1992 | Music .......................... 358/13  |
| 5,285,275 | A |   | 2/1994  | Abe ............................ 348/384 |
| 5,301,241 | A |   | 4/1994  | Kirk ............................ 382/56  |
| 5,355,447 | A |   | 10/1994 | Knowlton .................... 395/139 |
| 5,408,542 | A |   | 4/1995  | Callahan ...................... 382/56  |
| 5,544,286 | A |   | 8/1996  | Laney .......................... 395/114 |
| 5,585,944 | A |   | 12/1996 | Rodriquez .................. 358/500 |
| 5,625,759 | A | * | 4/1997  | Freeman ...................... 348/384 |

FOREIGN PATENT DOCUMENTS

| JP | 60180254 | 8/1985 |
| JP | 62074851 | 3/1987 |

OTHER PUBLICATIONS

Foreign Search Report.

* cited by examiner

Primary Examiner—Chris Kelley
Assistant Examiner—Shawn S. An
(74) Attorney, Agent, or Firm—Fulwider Patton Lee & Utecht, LLP

(57) ABSTRACT

Color video data is compressed by storing only the most frequently occurring colors in a block of pixel data. A minimum number of colors for the block is determined determining when colors in a block are the same or comparatively close to colors in the corresponding block of the previous video frame or are comparatively close to colors in the next previous adjacent block such that no additional color data needs to be stored, and by consolidating comparatively close colors withing the block. Two comparatively close colors are consolidated by substituting the more frequently occurring color for the less frequently occurring color in the block. Colors are comparatively close when the difference in their color values is less than a color threshold value. The color threshold value can be set by the user. If the minimum number of colors determined for the block is greater than four, then the color thresholds are adjusted and a new minimum number of colors is then determined. The pixel data of the block are stored in accordance with the minimum number of colors determined for that block. Greater compression is achieved when a lower minimum number of colors is determined for the block. Further compression can be achieved by incorporating a reference to a buffer containing common colors, and using a flag stored in the video stream to indicate when the data included in a byte of color data is an index value pointing to a color stored in the buffer rather than actual color data.

5 Claims, 7 Drawing Sheets

FIG. 1
PRIOR ART
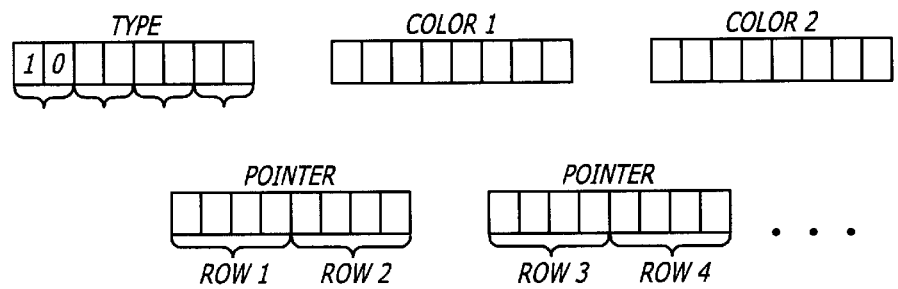
FIG. 2
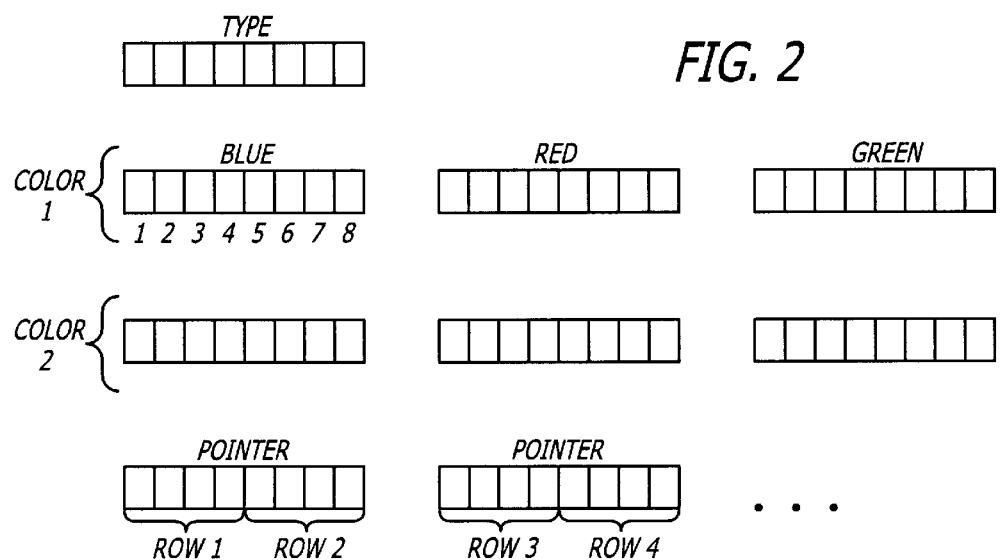
FIG. 3
| TYPE | CODING | RESULT |
|---|---|---|
| 00 | NO CHANGE | NO DATA FOLLOWS |
| 01 | ≤1 COLOR | DATA FOR 1 COLOR FOLLOWS |
| 10 | 2 COLOR | DATA FOR 2 COLORS |
| 11 | 4 COLOR | DATA FOR 4 COLORS |

FIG. 7
| COLOR | OCCURRENCES IN BLOCK | | |
|---|---|---|---|
| | PREVIOUS FRAME | CURRENT FRAME | AFTER COMPARING PIXELS |
| N | 4 | 3 | 0 |
| P | 3 | 1 | 0 |
| R | 3 | 7 | 3 |
| S | 3 | 5 | 2 |
| T | 3 | 2 | 0 |
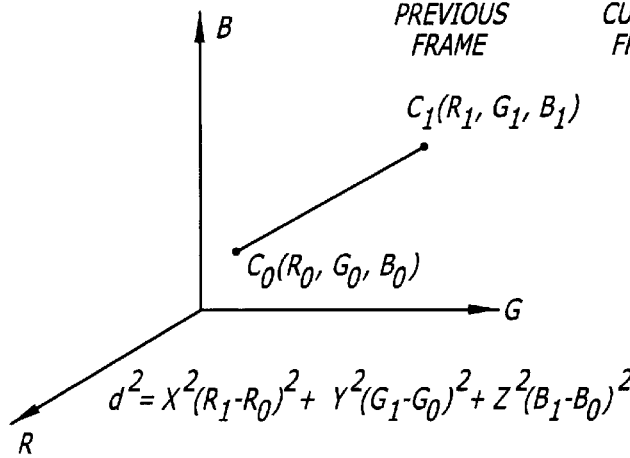
PREVIOUS FRAME / CURRENT FRAME / PIXELS STORED AFTER COMPARISON
FIG. 8
$$d^2 = X^2(R_1 - R_0)^2 + Y^2(G_1 - G_0)^2 + Z^2(B_1 - B_0)^2$$
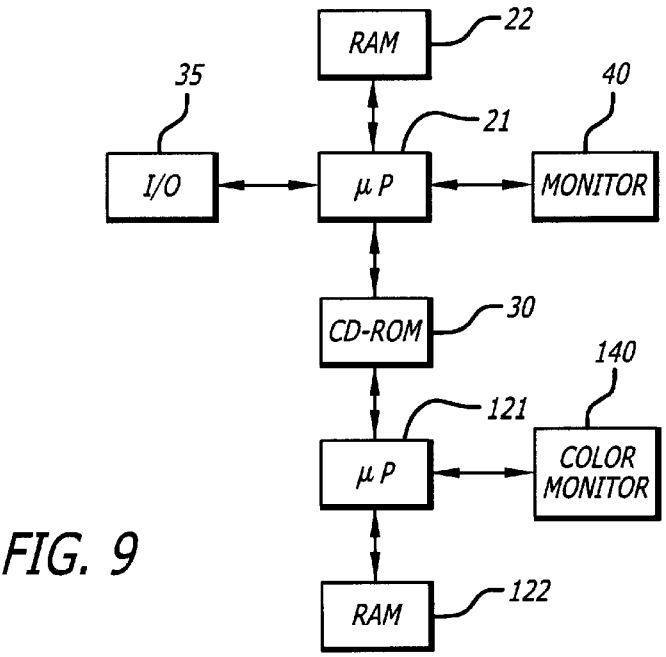
FIG. 9

VIDEO COMPRESSION AND PLAYBACK PROCESS

BACKGROUND OF THE INVENTION

This invention relates generally to compressing color video data and, more specifically, to varying the degree of compression as a function of the color characteristics of the video data being compressed.

Color video animations or videotapes of images or scenes can be used to enhance the realism and/or usefulness of computer generated displays and graphics. These video images are typically stored as a stream of digital color video data on a storage device such as a CD-ROM disk in a retrievable format. When desired by the viewer, or when directed by the software program, the color video data representing the video image is retrieved from the storage device and displayed on a display device, such as a video monitor. In practice, the video data is not displayed continuously, but is divided into a series of frames. Each frame of video data comprises the necessary information to display a single screen, or "snapshot" of the video on the display device. Displaying a sequential series of frames in rapid succession can create the illusion of moving pictures.

The quality and realism of the displayed image is a function of the resolution of the display device and the number of colors that the display device is capable of displaying. Typically, reasonable image resolution can be achieved with a display device that displays an image where the image consists of 480 horizontal lines of 640 pixels, or picture elements, per line, although images suitable for some video games may be displayed on devices having resolutions as low as 240 horizontal lines of 320 pixels. Recently, higher resolution display devices capable of displaying 1024 lines of 1280 pixels per line have become commonly available. Where only a simple, two-tone monochrome image is desired, each pixel can be represented by a single bit of video data, since the pixel is either illuminated or dark, depending on the image. Typically, however, monochrome images are displayed using eight bits of data to represent each pixel, allowing each pixel of the image to be displayed in one of a possible 256 shades of a single color. Images displayed in color are much more exciting and visually pleasing than monochrome images, especially when used to enhance the realism of video games and simulations. Substantially more information in the form of digital video color data, however, is required to reproduce color images. In the simplest case, at least three times as much digital data must be used to define a color to be displayed by an individual pixel, since each color consists of a combination of the primary colors red, blue and green, and each of these colors must be defined by digital data. Current display devices, using the RGB (red-blue-green) format are capable of providing as many as 16,777,216 colors by using 24 bits of color video data to define each pixel.

Where relatively static images are to be displayed, the amount of color video data required is not a critical factor in the performance of the software program. However, where a video animation or moving image is desired, the video will appear jerky, unnatural and unrealistic if the video data is not displayed at a rate of at least 30 frames per second, the NTSC television standard. A single video clip lasting one minute must thus be composed of at least 1800 frames of video color data. This enormous amount of video color data must be stored on and retrieved from a CD-ROM or other device having enough storage space to hold all the video color data for the video clip.

A further problem is that storage devices such as CD-ROMs have limited data transfer rates, typically a maximum of about 600,000 bits per second. Where the data cannot be retrieved and displayed rapidly enough, the formation of the video image may stall momentarily while the color video data is being transferred from the storage device to the display device, and detracts from the realism of the displayed video images. In order to increase the effective speed of such storage devices and decrease the wait time for generating a moving color video display, numerous compression and decompression techniques to reduce the amount of color video data that must be stored and retrieved have been proposed. Some compression techniques divide a picture or image into a matrix of blocks, each of which is in turn divided into a matrix of picture elements or pixels. The picture or image can be converted into digital data which can then be used to generate a video display of the original picture, wherein certain information must be encoded for every pixel of every block. The amount of data required per pixel and the quality in detail of the picture that can be generated from the data are important characteristics of any compression system. In some instances, the data is compressed in a uniform manner block-by-block or frame-by-frame. In this way, m bits of compressed data are used to represent each n×n block of pixel data. Other systems utilize an adaptive compression method wherein color video data is examined block-by-block, and the type of compression to be used is then determined for each block. In one known system, two diverse colors for each block are determined by averaging the colors that are above and below the mean luminance for the block. These two computed colors may then be compared to a threshold value in order to determine the number of colors to be stored for the block.

Another method of compressing and decompressing a stream of video data is disclosed in U.S. Pat. No. 5,625,759. In this patent, each frame of video is broken up into blocks of pixels, and then the number of colors in the block is minimized by collapsing colors which are not substantially different from the colors of neighboring pixels into the color of the neighboring pixel.

While each of the methods described above usefully compress video data where the color data consists of "eight-bit" data, the use of such data may lead to unwanted artifacts during playback. Such artifacts can be readily observed in background scenes, such as where a plane is silhouetted against a cloudy sky. In such a visual scene, compression of the colors may cause streaking or banding of the colors in the scene.

It is well known that many of the visual artifacts observed in scenes created using compressed eight-bit color data can be suppressed using color data wherein the colors are described using twenty-bit or higher color definitions. However, until now, the use of such higher data definitions negated any advantage obtained in compressing the color data, since, for example, twenty-four bit color data requires three times as much data storage as does eight-bit color data.

What is needed in the art is a method of compressing and decompressing color video data so that the recreated video image accurately reflects the colors of the original video image while reducing the amount of data necessary so as to produce moving color images in real time from storage devices having a fixed data rate. In particular what has been needed is a method of compressing color video data consisting of higher resolution color data, such as twenty-bit (or more) color data, such that the storage space required for the resulting compressed color data is approximately the same as that required for previously available compressed eight-bit color data. Using such a method, the video stream should be capable of producing essentially artifact-free visual scenes without incurring a penalty of increased storage resources. Moreover, the increased resolution and freedom from artifacts is obtained without lagging behind the video display. The present invention meets these needs.

SUMMARY OF THE INVENTION

The present invention is directed towards a method for compressing color video data for storage using the colors of the original video image.

In an embodiment of the invention, the method of compressing color video data comprises the steps of dividing a color video frame into blocks of color video data; determining the colors present in a block; calculating a minimum number of colors necessary for the block according to a color threshold; and storing the color video data in the block in accordance with the minimum number of colors necessary for the block, wherein the minimum number of colors is less than or equal to a predetermined number.

The minimum number of colors necessary for the block can be calculated by sorting the determined colors present in the block by frequency of occurrence of each color; comparing each of the determined colors to each other determined color; ascertaining comparatively close colors from the comparison of each determined color in accordance with the color threshold; and substituting the more frequently occurring color for the less frequently occurring color of two comparatively close colors.

If the calculated minimum number of colors is greater than four, then the color threshold can be adjusted and the minimum number of colors necessary for the block can be recalculated accordingly.

The step of determining the colors present in the block may further include the step of comparing each pixel in the block to the corresponding pixel in the next previous adjacent block. Where all of the colors in the next previous adjacent block are substantially similar, within a predetermined threshold of similarity, the data stream is encoded to indicate that the same colors may be used in the current block as were used in the next previous adjacent block, thus negating the need to store color video data to describe the pixels in the current block.

The step of determining the colors present in the block can further include the step of comparing the colors present in the block with the colors in a corresponding block in a previous video frame, wherein the color is given a zero value if the difference between the colors present in the block and the colors in the corresponding block is less than a transparent threshold value.

In a further embodiment, the present invention may further optimize the compression and decompression of the video color data by determining if the color to be compressed or decompressed is a so-called "common" color that is already stored in a FIFO buffer. If the color is already stored in the buffer, then the compressor need only store an index value for that color, rather than an entire set of color bytes describing that color, thus reducing by two the number of bytes required to store each "common" color. When decompressing the video data stream, one of the bits in one of the color bytes may be used as a flag to indicate to the decompression system that the value contained in the color byte is an index value to the color stored in the FIFO buffer.

When reading data from storage devices having a fixed data rate, full motion video images can appear jerky and unnatural where the frame contains more video data than can be read at the fixed data rate given the time allotted for displaying the frame. In order to achieve smooth playback of moving video images, the amount of data being read from storage devices such as a CD-ROM should be decreased so as to allow the processor to capture a sufficient amount of the color video data to reproduce full motion video in real time.

In addition, in even high density storage devices, there is still a practical limit to the amount of data that can be stored. Compression of color video data can allow an increased number of video frames to be stored, thereby increasing the playing time of the device.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a diagram illustrating a data stream format used for the compressed data for two colors in accordance with a prior art compression method.

FIG. 2 is a diagram illustrating a data stream format used for the compressed data for two colors in accordance with the present invention.

FIG. 3 is a list of the two bit words of the TYPE byte used to indicate the type of compression or coding in accordance with an embodiment of the invention.

FIG. 7 illustrates yet another color queue and corresponding block of pixel data being coded in accordance with an embodiment of the invention.

FIG. 8 is a diagram illustrating the method used to determine the closeness of colors in RGB space.

FIG. 9 illustrates a computer system for coding and decoding color video data in accordance with an embodiment of the invention.

DETAILED DESCRIPTION OF PREFERRED EMBODIMENT

Figure 4A:
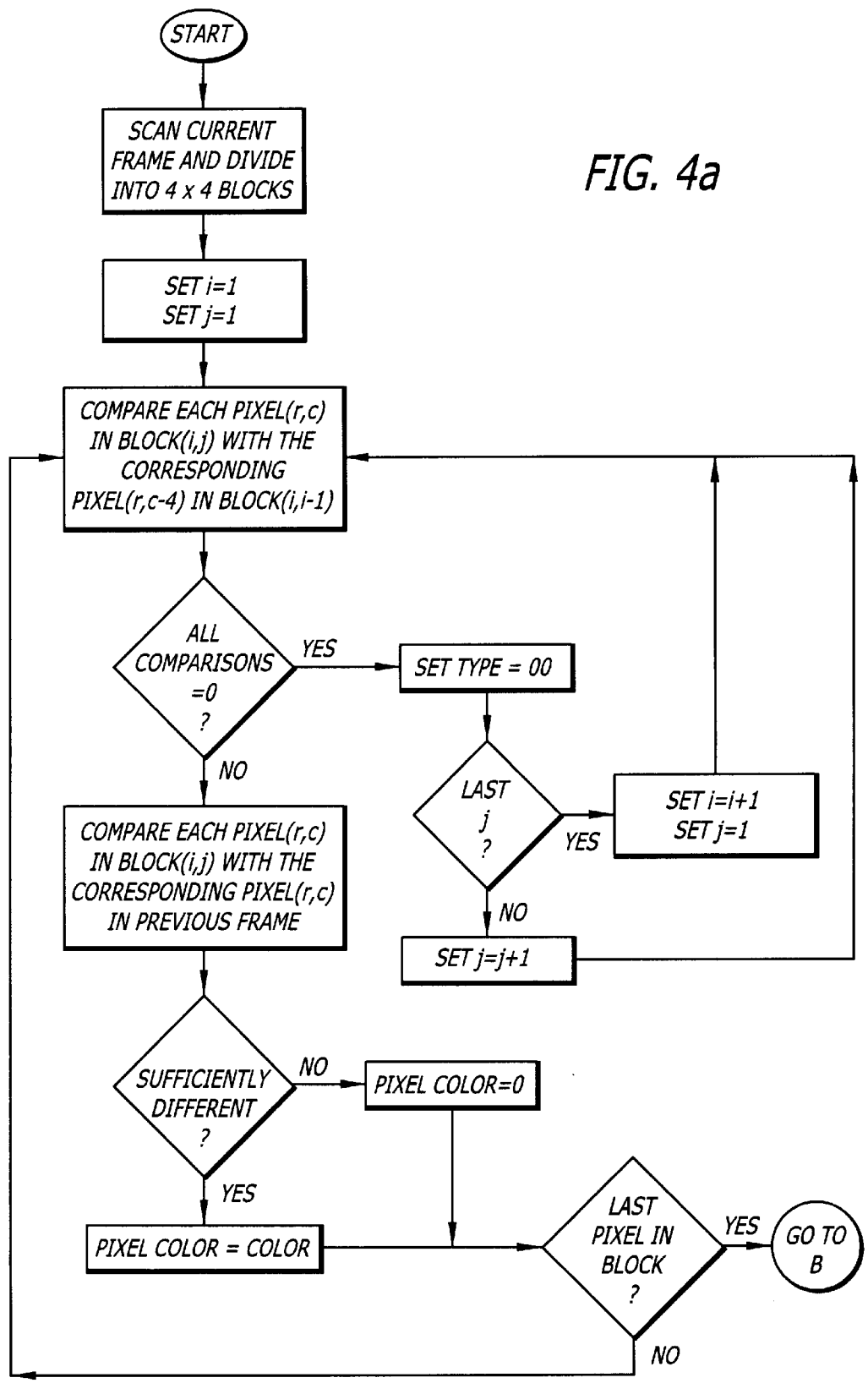
FIGS. 4a–4d are flow charts describing and outlining the compression method in accordance with an embodiment of the invention.

As shown in the exemplary drawings, the invention relates to a method for compressing color video data representing frames of color video images to reduce the amount of data stored for each frame and to increase the speed at which such video images can be retrieved and displayed. As described herein, reference will be made to numerous specific details, such as the specific number of bits in a data stream, the number of pixels in a block, etc., in order to more fully describe the invention. However, it should be clear to one skilled in the art that the present invention is not limited to the specific details.

In the present invention, a stream of video data is divided into a sequence of video frames, with each frame comprising video data for displaying a plurality of pixels, with each pixel having an associated color, to display a single display screen or "snapshot" of a color video to be displayed during operation of a computer program. Each frame is scanned and then divided into a matrix of pixel blocks. Each block contains a matrix of pixels, wherein a 4×4 pixel block contains sixteen pixels. Each pixel can be addressed to represent a different color. Thus, a specific color can be assigned for each pixel in the block. The color data in the pixel blocks will then be stored and compressed in a data stream. From this point onward, the terms compressing and coding will refer to the method by which the color video data is stored in the data stream.

FIG. 1 depicts a data stream of color video data compressed in accordance a prior art method. In this example, the data stream includes data for two colors. The first byte of the data stream is called the TYPE byte. This byte has eight bits, which are divided into four two-bit words. By dividing the first or lead byte in this manner, the processor is informed of the color scheme used for the next four pixel blocks, and can manipulate the data accordingly. Each block is preferably a 4×4 pixel block for a total of 16 pixels in a block.

Following the TYPE byte are the COLOR bytes, which are used to identify the colors of the pixels within the pixel block. In this prior art method, each COLOR byte has eight bits, thus lending itself to systems using eight-bit color. In this method, the COLOR byte can therefore address up to $2^8$ or 256 colors on a color map stored in memory. The coding and decoding of color video data will be performed in accordance with this color map memory. During decoding, the memory addresses identify the desired colors for the various pixels, and the data specifying the colors are read out with the corresponding memory locations. As is apparent from this figure, a fully optimized data stream representing a 4×4 block having two colors may be compressed to require just five bytes of data.

FIG. 2 depicts a data stream of color video data compressed in accordance with the present invention using twenty-four-bit color video data. In this example, each color includes the R, G and B component values for a video display. In a 24 bit display, an RGB triplet is used having three color maps corresponding to the R, G and B component values, respectively. Specifically, three bytes will be required to identify each color: a red COLOR byte having 8 bits will represent the color red (R), a green COLOR byte having 8 bits will represent the color green (G), and a blue COLOR byte having 8 bits will represent the color blue (B). Thus, the RGB triplet will be the equivalent of a 768 byte map (i.e., 3×256). Each color of the 256 color map can be indexed onto the RGB triplet, and each color value to be stored has an R, G and B component value. In this way, each COLOR byte can address its own color map. It will be immediately apparent to one skilled in the art that the invention is not limited to systems using twenty-four bit color. While preferably a twenty-bit or higher data resolution is used to provide the color data stream of the present invention, other resolutions of color may be used as desired by the software developer.

In the data stream shown in FIG. 2, only six COLOR bytes are shown for the two color data scheme (TYPE 10). Thus, for this example, as many as nine bytes of data are required for each 4×4 block. However, the number of bytes may be reduced to as few as four bytes by applying additional compression optimization methods such that twenty-or-more-bit color video data may be stored in approximately the same data storage space as the prior art method for compressing eight-bit color video data. These methods will be discussed in further detail below.

Following the COLOR bytes are two POINTER bytes, with each byte being divided into two four-bit words. This total of four four-bit words addresses the colors for the pixel block. The first word (i.e., Word 1) contains the pointer to the color for the first row (i.e., Row 1) of the 4×4 pixel block, with each bit pointing to either the color 1 or color 2 for the individual pixels in that row. Word 2, Word 3 and Word 4 contain the pointers for Row 2 through Row 4, respectively. Where four colors are required for the block (i.e., TYPE 11), then four bytes will be required for the pixel pointers since each pixel will require a two-bit pointer.

The TYPE byte in the data stream includes four two-bit words which indicate the structure and the number of colors for the coded blocks in that data stream. Four pixel blocks are coded in the data stream identified by the TYPE byte. Each two-bit word signifies the data structure to be used for a pixel block. After the last POINTER byte shown in FIG. 1, another set of COLOR bytes and POINTER bytes can be expected according to the second word of the TYPE byte, and so on.

As shown in FIG. 3, there are preferably four different types of color coding schemes for the present invention. These coding shemes are identified by the two-bit words. TYPE 00 coding indicates that the color of the present block is the same as the next previous adjacent block, and thus no color data follows in the data stream. In TYPE 01 coding, the data stream includes information for zero or one colors. This allows identification of a fifth type of color coding. When the coding TYPE is 01, and the first COLOR byte is 0, no color data follows in the data stream because this coding scheme indicates that the colors of each pixel in the block are the same as the corresponding pixel in the same block in the next previous frame. Thus, this coding combination indicates that the block is transparent, i.e., the colors from the previous frame show through. Where TYPE is 01, and the first COLOR byte is not 0, there will be data for one color, that is, the color indicated by the color data in the first set of three COLOR bytes. In TYPE 10 coding, there will be data for two colors, and for TYPE 11 coding, data for four colors will be found.

Where only three colors are required for the block, TYPE 11 coding (i.e. the four color scheme) can be employed wherein the fourth set of COLOR bytes are unused. The fourth set of COLOR bytes may be empty, or merely contain superfluous color data that will not be referenced by the POINTER bytes. Alternatively, the three colors for the block may be forced into a two color scheme by eliminating the third color. Occasionally, no compression can practically be performed for the block, and a full sixteen sets of COLOR bytes will be required (i.e., one color (three COLOR bytes) for each pixel) following the TYPE byte. In this situation, a TYPE 01 byte is used wherein the COLOR byte has an arbitrary value other than zero. This arbitrary value may be selected by the software developer to be a value that is not otherwise indicative of a color. Since each COLOR byte has eight bits (bits 1 to 8), the software developer may choose to use one of the bits, for example, bit 8, as a flag to indicate no compression is possible. Thus, when the first COLOR byte is analyzed to decompress the video data stream, if the analyzer detects that bit 8 of the first COLOR byte in the data stream is set to 1, the analyzer may determine that no video compression was possible and that forty-eight COLOR bytes (3 bytes×16 pixels) of color data follows for that block. Similarly, if bit 8 is set to 0, then the analyzer determines that a single color is needed for the block, and that the appropriate number of COLOR bytes follow. However, in most instances, the number of colors present in a block can be reduced to four or less without significantly degrading the image.

An advantage of these arrangements of storing color data is that if the word in a TYPE byte for a specific block is 00, indicating that no change in color has occurred from the next previous adjacent block, then no additional data is necessary for that pixel block, thereby saving at least six bytes. No COLOR bytes are used in a TYPE 00 data stream. If the block is the same as the identical block in the previous frame, then TYPE 01 coding is required, and only one color BYTE is necessary for the block, saving five bytes. Where there is only a single color needed to display the block, then only the single set of COLOR bytes is necessary, saving three bytes. Where two colors are necessary for the block as shown in the TYPE 10 data stream of FIG. 1, six bytes are saved over the amount of data required for four colors.

Where five or more colors are present in the block, at most only four of those colors will be present in the corresponding TYPE 11 data stream. Color compression is achieved by reducing the number of colors being saved for a block. For example, if two colors are sufficiently similar to one another, then those two colors are considered to be the same color. Only one of those two colors will be used in a TYPE 01 data stream instead of a TYPE 10 data stream. The exact structure of the data stream being stored is dependent upon the number of colors being stored and the size of the blocks of pixel data.

FIGS. 4a–4d show block diagrams of the steps used to determine the type of coding to be used for the blocks of a video image. The colors of the video frame correspond to those present in the color memory map. However, where the video frame to be coded includes colors not identically present in the color video map, then the closest available approximation of the color in the video frame can be used.

In a presently preferred embodiment, each new frame in a succession of frames is scanned and divided into a 4×4 pixel block. The colors of each pixel in each 4×4 block of the video frame are analyzed and then coded in a data stream in accordance with the coding scheme shown in FIG. 3. The analysis and coding of the color video as shown in FIGS. 4a–4d will generally proceed in four stages, wherein the color values are first computed, then sorted according to their frequency of occurrence, and then compared to one another so as to determine the minimum number of colors necessary for coding the block.

In the first stage, as shown in FIG. 4a, color values are determined for each pixel of the block in the current frame. This color value may be determined from the RGB signals for each individual pixel. After the color value for each pixel in the block is determined, each pixel of the block in the current frame is then compared with its corresponding pixel in the next previous block. If all of the comparisons are zero, that is, there are no substantial differences in the colors of the sixteen pixels making up the block, coding TYPE 00 is used. If all of the pixels do not have substantially the same colors as the corresponding pixels of the next previous adjacent block, each pixel of the block is then compared with the corresponding pixel of the next previous video frame. If the colors of the corresponding pixels are the same, or if the difference in their color values is less than a transparent threshold value, the color value of that pixel is set at 0. That particular pixel should be "transparent" in relation to the pixel color of the previous frame. This "transparent" color value is considered a color and is counted as such in the coding process to be discussed in greater detail later. If all of the pixels in the block are "transparent", then that block will be subject to TYPE 01 coding, and the first COLOR byte will be set to 0. Thus, the use of a "transparent" color value nullifies the need for COLOR bytes in the data stream where all of the pixels of the block are unchanged from the previous frame.

The transparent threshold value for determining the similarity in the colors of corresponding pixels can be either a fixed set value or one selected by the user. The color value of the pixel of the current frame is considered to be "sufficiently different" from the color value of a corresponding pixel of the previous frame where the difference between the color values of the corresponding pixels is greater than the transparent threshold. The "sufficiently different" color value of the current pixel is then stored in the buffer memory, and the next pixel is then analyzed. Each pixel in the block is analyzed in this manner, and a running tally or queue is maintained for the pixel color values and their corresponding frequency of occurrence (N) within the pixel block.

Figure 4B:
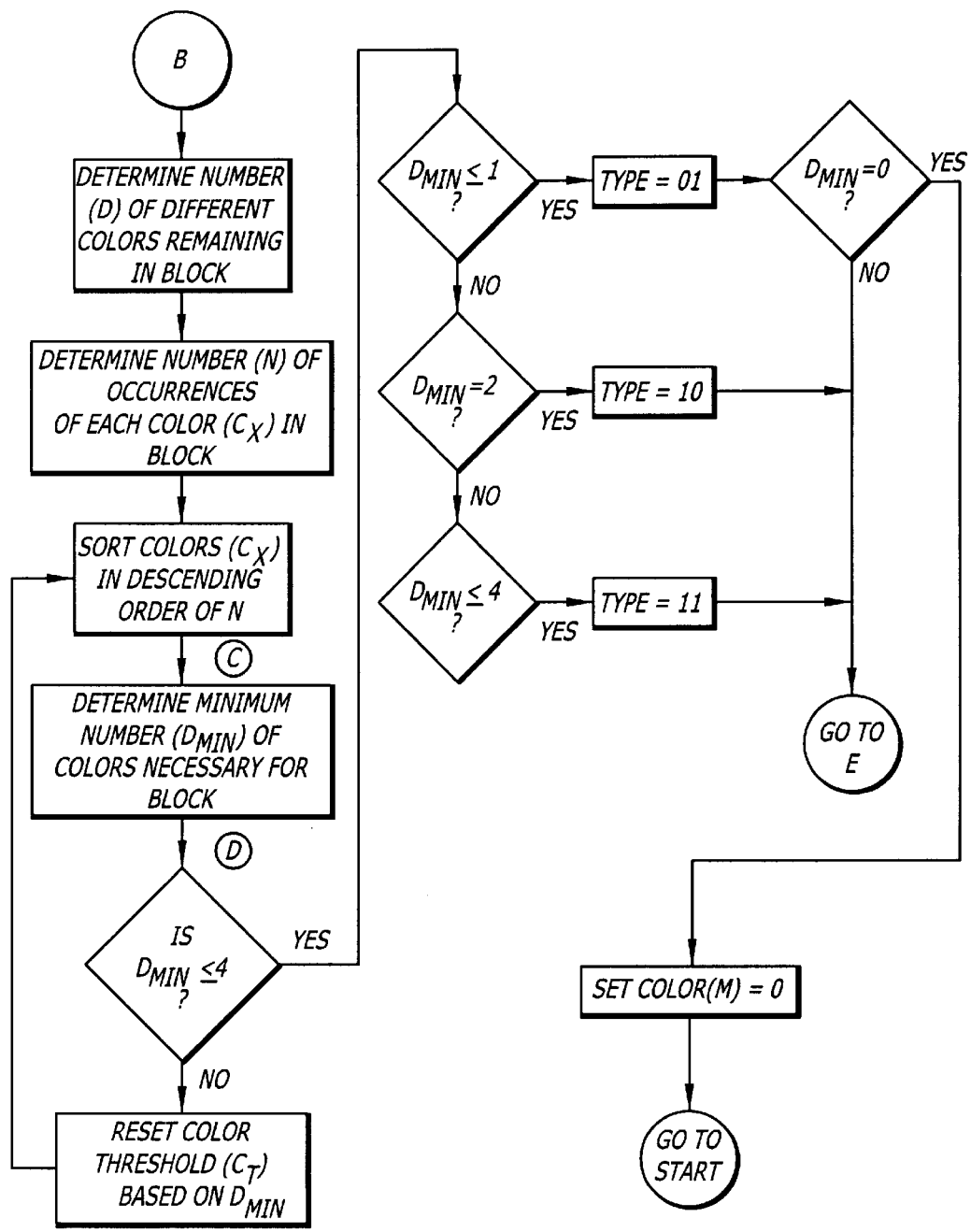

The second stage of the analysis, as shown in FIG. 4b, begins after each of the 16 pixels in a 4×4 pixel block have been compared to their corresponding pixels in the next previous adjacent block and the previous frame. The queue of color values is sorted in descending order of the number or frequency of occurrences for each color. The color value for each color is stored in relation to the frequency of occurrence for that color in the block. These values may be stored by any means known in the art such as a look-up table in memory.

Figure 4C:
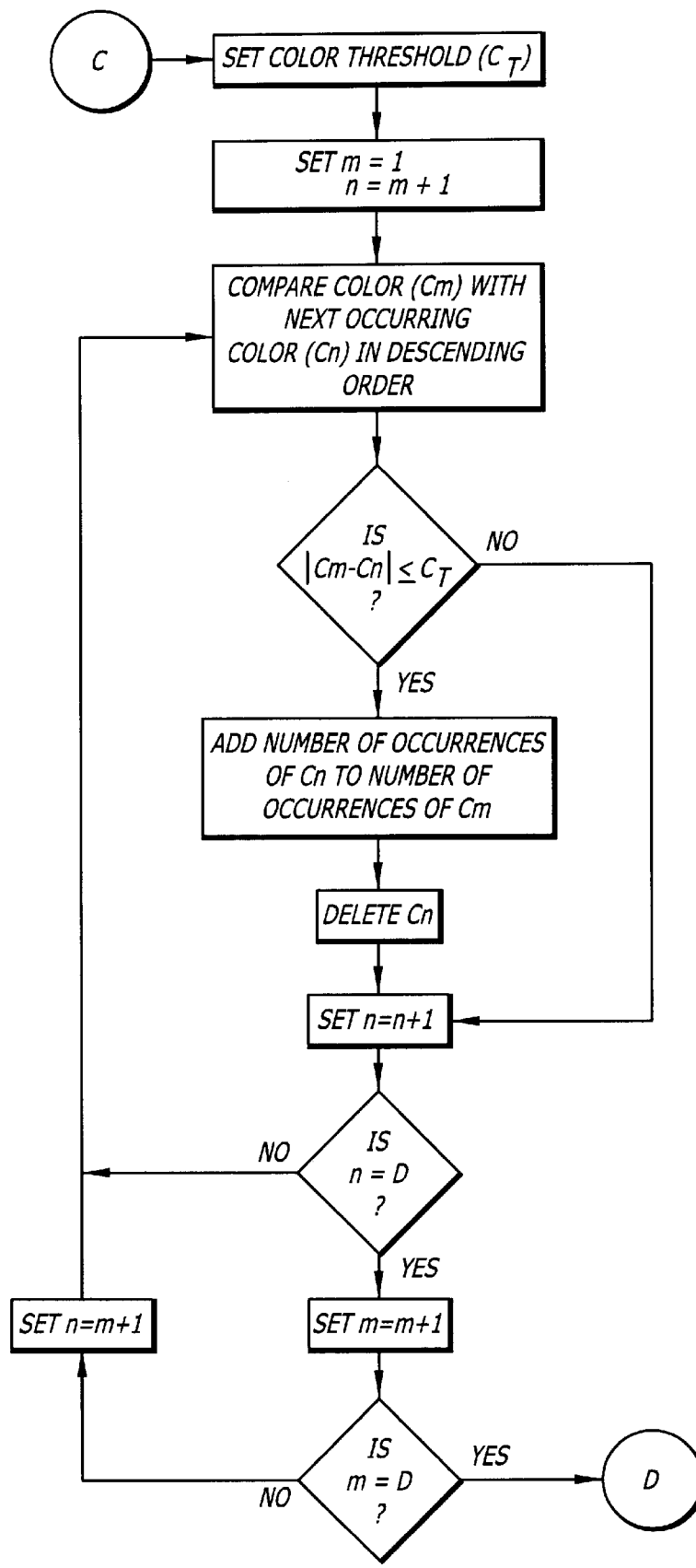

In the third stage of this analysis, shown in FIGS. 4b and 4c, the number (D) of colors currently in the pixel block is reduced to a minimum number ($D_{min}$) of colors necessary for each block of pixels by comparing each color value with every other color value in the queue. The minimum number of colors can be set by the user to one, two, three or four; or can be adaptively determined by a preprogrammed processor. Preferably each color value ($C_m$) is sequentially compared to the other color values ($C_n$), beginning with the most frequently occurring color value. This iterative process, shown in FIG. 3c, determines the minimum number of colors for each block of pixels. Colors are considered to be the same or comparatively close, where the difference in the color value between two pixels is less than a color threshold value ($C_T$). This color threshold value can be fixed or otherwise set by the user, or may be adaptively determined by the system. The compression scheme will result in greater contrast where the color threshold value is set at a higher level. Greater compression can be achieved at the price of higher contrast.

If the less frequently occurring color is determined to be sufficiently close to the more frequently occurring color, as determined by the color threshold value, the count or number of occurrences for the less frequently occurring color is added to the count of the more often occurring color. In this way, the pixels having the less frequently occurring color value are now given the more frequently occurring color value. The less frequently occurring color is then deleted or removed from the queue. This consolidation of comparatively close colors substantially reduces the amount of data needed to be stored for each block. If the two compared colors have a difference in color value greater than the color threshold, the occurrence count for each color is maintained. Preferably, "transparent" colors are never consolidated with a more frequently occurring color. For example, the thresholds and parameters of the system may be set up so that "transparent" colors will always be considered sufficiently different from the other colors.

When each color in the queue has been compared to every other occurring color in the queue, then the type of coding or data storage, representing the effective compression of the color data, is then determined. If all the colors have a "transparent" value of zero, then there has been no significant or appreciable change from the previous frame and TYPE 01 compression is then used and the first COLOR byte is set to 0. If only one color remains present on the queue, then TYPE 01 compression is also used, which requires only one set of COLOR bytes, that is, a red COLOR byte, a green COLOR byte, and a blue COLOR byte. If two colors remain present on the queue, then TYPE 10 compression requiring two sets of COLOR bytes is used. If three or four colors are present, then TYPE 11 compression is used, requiring four sets of COLOR bytes in the data stream. Where only three colors are present, one of the sets COLOR bytes will not be referred to by the pixel pointer. These unused byte may be set to a zero value.

As discussed earlier, where three colors remain in a block, instead of allowing three bytes to go unused, the three colors of the block may be forced into a two color scheme by eliminating the third color. This would be performed by adjusting the color threshold value, and then comparing the initial colors of the block using the adjusted threshold value to force the new minimum number of colors to two. Of course the color threshold value may also be adjusted to fill out the unused COLOR bytes by forcing the process to select the minimum number of colors of four instead of three. In either instance, the minimum colors are selected from the set of actual color values originally determined for each pixel in the block.

If more than four colors remain present on the queue, then the color threshold value is adaptively adjusted by the system based on the number of remaining colors to ensure that no more than four colors remain. The third stage of determining the minimum number of colors is then reiterated using the newly adjusted color threshold values to further consolidate the number of colors remaining in the queue. No new color values are calculated in this process. Only the actual color values originally determined for each pixel in the 4×4 block are coded and stored. The color values for certain pixels are replaced with a comparatively close but more frequently occurring color value. It is by this substitution of color values that color video data is compressed as it is stored along the data stream.

After the number of different colors remaining in the block has been sufficiently reduced, the color data and the corresponding pointer data for the remaining colors are used to encode the data stream. The data stream with the coded color data for the current block is then written to the storage media. This type of storage compression allows a sufficient amount of data to be read from storage devices such as CD-ROMS having a fixed data rate to produce a smooth display of a moving color image in real time.

Figure 4D:
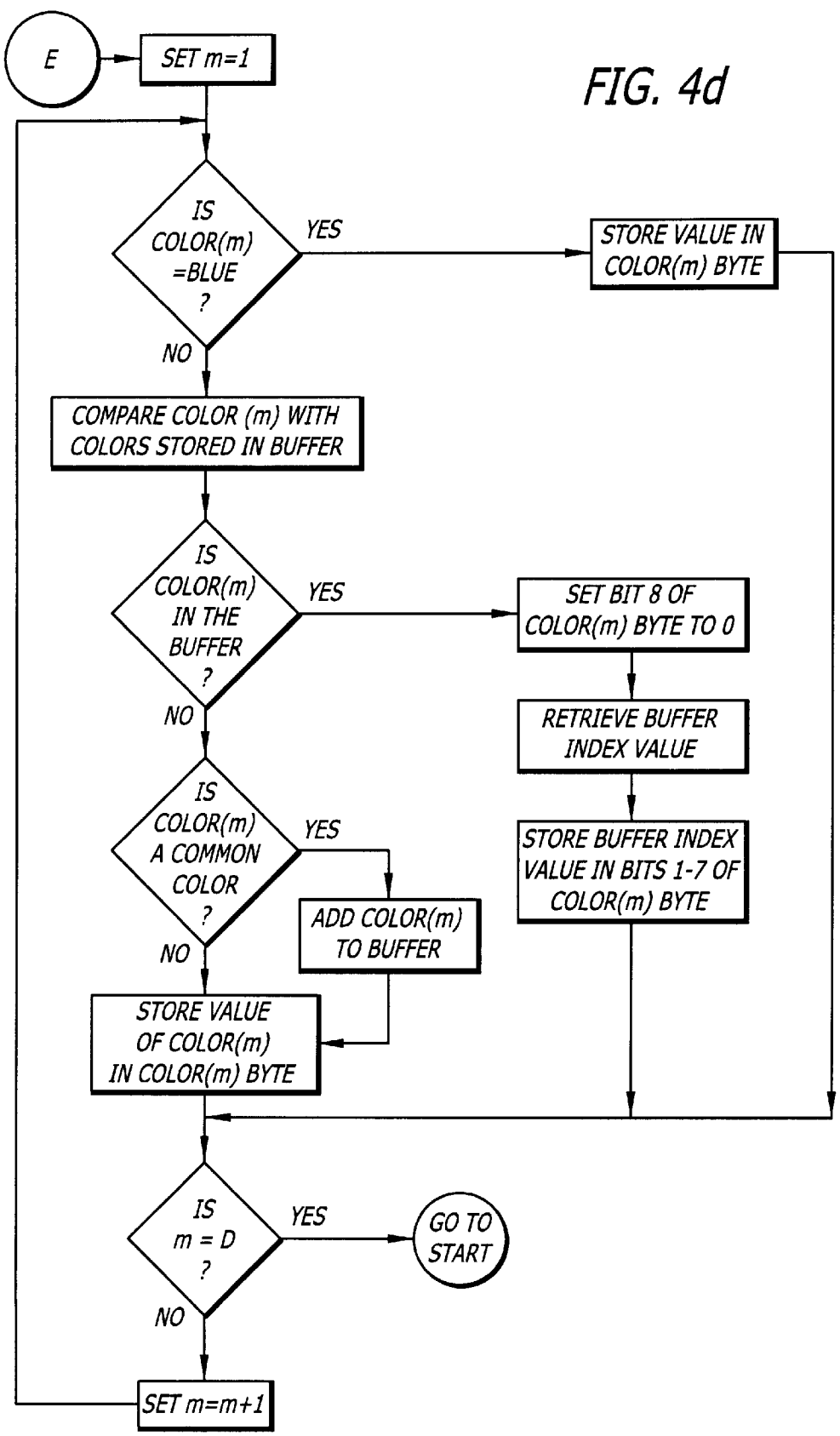

FIG. 4d depicts further optimization of the data stream incorporated into a preferred embodiment of the invention. This optimization procedure is based upon the fact that the human eye is least sensitive to colors in the blue area of the color spectrum. For example, rather than requiring eight bits of information to identify a particular shade of blue, the software developer may choose to use only seven bits, providing a pallet of only 128 possible shades of blue instead of 256 shades as are provided for red and green. Since the human eye is less sensitive to the color blue, however, it has been determined that the loss of resolution of the color blue does not effect the overall quality of the visual scene presented to an observer.

In this embodiment of the present invention, each color that is presented to the compressor is stored in a first-in-first-out (FIFO) buffer. However, in a preferred embodiment, not all colors are stored in the FIFO buffer; rather, only those colors that have been determined by the software developer to be so-called "common" colors are stored in the buffer. These so-called "common" colors are selected by the software developer dependent only on the requirements of the visual scene presented, and may be adjusted for each frame of the video stream if necessary.

If the color is blue, the value of the color is stored in, for example, bits 1 through 7 of the COLOR byte. If the color is not blue, the color is compared to the colors stored in the FIFO buffer. If the color is in the FIFO buffer, bit 8 of the COLOR byte is set to 1, although the alternative method where bit 8 is set to zero may also be used. After bit 8 is set to 1, the seven remaining bits of the COLOR byte may be used as an index value to colors in the FIFO buffer. Thus, a total of 128 colors may be stored in the FIFO buffer, and referenced using bits 1 through 7 of the COLOR byte. Since the color is already in the FIFO buffer, only the seven-bit index value must be stored, rather than the entire three bytes normally necessary to define the color. This results in a savings of two bytes. In the case where two colors are needed in the block, and both are already in the FIFO buffer, only two COLOR bytes are needed instead of the six bytes normally required. Thus it is possible to store two twenty-four bit colors in the same storage space as two eight-bit colors.

It will be apparent that the compression system and the decompression system must be synchronized for this method to operate correctly, since when the data is decompressed, the index value stored in bits 1 through 7 of the COLOR byte must reference the same color. If the FIFO buffer of the decompression system is not synchronized with the FIFO buffer of the compressions system, the index value may not refer to the same color, resulting in unwanted color defects in the displayed visual scene. The methods for providing such synchronization are well known in the art, and will not be described further herein.

If the color is not already in the FIFO buffer, the compression system determines whether the color is one of a number of predetermined "common" colors. If the color is a "common color", it is added to the FIFO buffer, and the value of the color is stored in the appropriate COLOR bytes. If the color is not a "common" color, then the color is not added to the FIFO buffer. When this process has been completed for all of the colors determined to be necessary for the block, the next block is analyzed.

Figure 5:
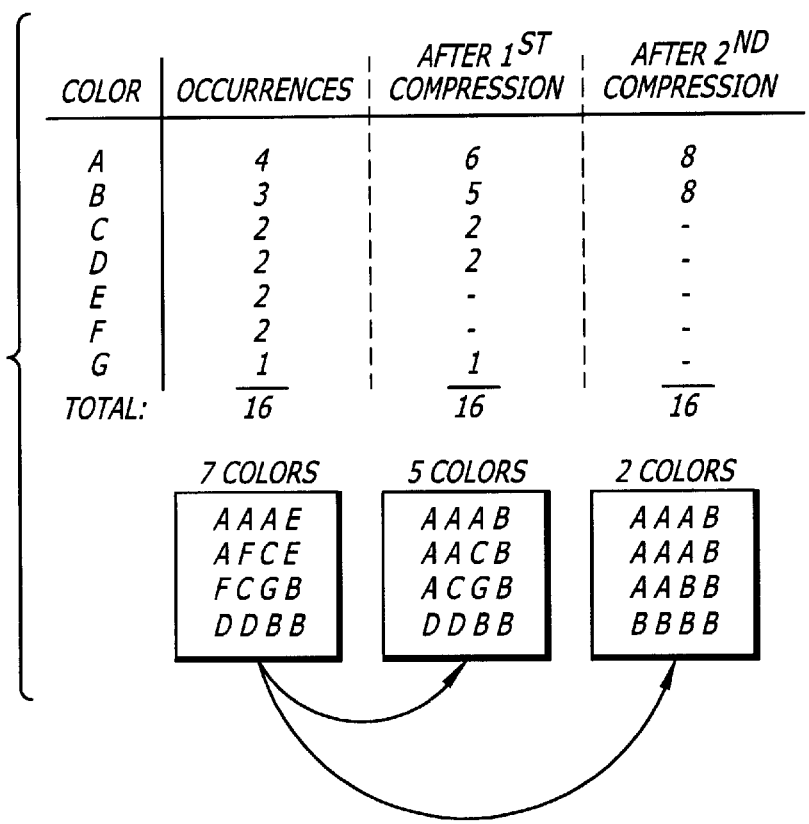
FIG. 5 illustrates a color queue and a corresponding block of color pixels being coded in accordance with an embodiment of the invention.

FIG. 5 illustrates an exemplary queue of color values for a 4×4 pixel block. The queue may be in the form of a look up table, or any other means known in the art. The seven color values A through G represent various color values for the pixels in the block, and the corresponding numbers indicate the occurrence count for each color value in the block. The color values A through G generally correspond to the color values ($C_x$) discussed in connection with FIG. 4. As discussed earlier, the color values are sorted in descending order in accordance with the occurrence count for each color value.

In the illustrated example, it is assumed that the seven colors are not transparent, and are different from the colors in the corresponding block of the previous video frame. Color value A is compared with every other color value in the queue in descending order. Color value A is compared with color value B, then color value C, and so on. The process is repeated as color value A is compared with each subsequent color in the queue. In this example, color value A would correspond to color ($C_m$) and color F would correspond to color ($C_n$) in FIG. 4. If color value A is considered to be sufficiently close to color value F, that is, if the difference between their respective color values is less than the color threshold value ($C_T$), then the queue will be updated accordingly. Because color value A occurs four times, while color value F occurs two times, color value F will be collapsed or consolidated with color value A. The queue will record that color value A occurs six times in the block and color value F is removed from the queue. FIG. 5 shows that color value A effectively takes the place of color value F in the pixel block. If no other color is found to be comparatively close to color value A, the next remaining color in descending order is then used. In the illustrative example, color value E is later collapsed into color value B.

After the first compression process, as shown by the pixel blocks in FIG. 5, five colors remain from the initial seven colors. The color threshold value is then adaptively adjusted, preferably by a preprogrammed processor, based on the number of remaining colors in the pixel block. The compression process then begins anew with the adjusted color threshold value. The processor preferably retains the initial color queue in memory so that the initial seven colors of the block are used with the adjusted color threshold value. It is noted that at the end of this second iterative process, only color values A and B remain on the queue, but the number count of occurrences of the colors in the pixel block remains at sixteen. No new colors have been calculated for the block. However, certain color values have been substituted and replaced by preexisting colors in the block. The three pixel blocks shown in FIG. 5 represent the pixel colors in the queue at various levels of compression.

In the illustrative example, only two colors, A and B, remain after this second compression process. These two colors and their respective position pointers for the pixel block are then coded in a TYPE 10 data stream, as previously discussed and shown in FIG. 2, for storage in a CD-ROM or other suitable storage device. This compression and storage technique results in a slightly higher contrast, but still retains several of the original color elements of the image which can be read out of memory to provide a smooth playback from fixed data rate devices. Although some intermediate color shades are lost in the coding process, a series of sequential video images can be compressed and decompressed with a minimal amount of hardware so that the amount of data needed to display each video frame does not exceed the data limit imposed by fixed data rate devices such as a 300 Kb/second CD-ROM. Coding the color video data in this manner provides for the smooth playback of all of the stored frames of video images. The increase in the overall contrast image can be corrected during decompression with a blur filter as data is read from the CD-ROM.

Figure 6:
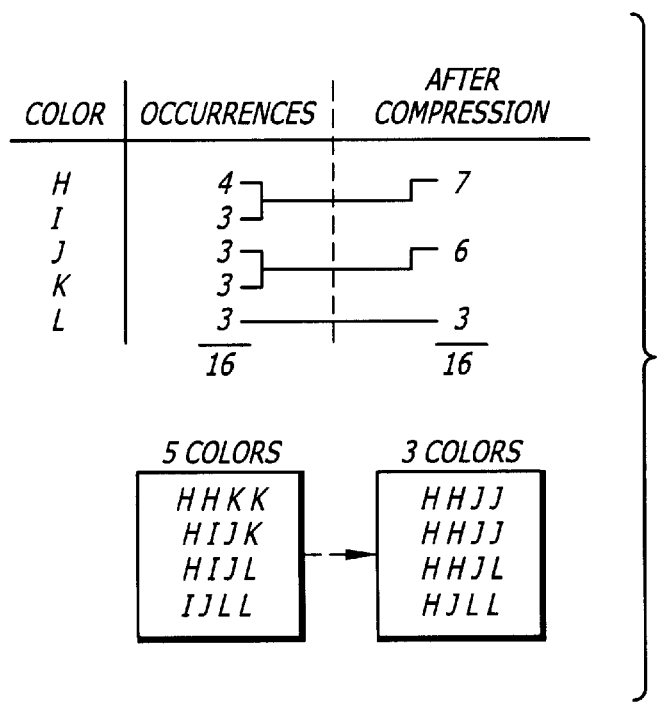
FIG. 6 illustrates another color queue and corresponding block of pixel data being coded in accordance with an embodiment of the invention.

FIG. 6 illustrates the queue of color values for another block. As in FIG. 5, the variable values H through L represent various color values and the corresponding numbers indicate the number of occurrences for each color value in the block. As indicated earlier, the color values are sorted in descending order in accordance with the number of occurrences for each color value. In the second illustrated example, color value H occurs five times, while color value I occurs four times. If color value H is considered to be sufficiently close to color value I in accordance with a color threshold value, the queue will be updated to show that color value H occurs nine times and color value I will be removed from the queue. The process continues, and if no other color is found to be comparatively close to color value H, the next remaining color, which is color value J, would then be used and compared with the remaining colors in descending order.

Should color value J and color value K be found to be comparatively close, one of the color values will be selected and its number of occurrences in the queue will be increased by the number of occurrences of the other color. Because both colors occur the same number of times, a secondary criteria is used to determine which color will remain on the queue. For example, the color value with the higher luminance value may be selected. Alternatively, the colors could be collapsed together where the differences between their respective color values is below another predetermined threshold value. Because the color values are relatively close, the selection of one color over the other should not have a significant impact on the overall image. However, there may be situations where it would be desirable to force the colors to a higher or a lower color value. For illustrative purposes only, the occurrences of color values J and K will be collapsed to color value J. At the end of this iterative process, only color values H, J and L remain on the queue, and the count of color occurrences in the block remains sixteen. These three remaining color values can then coded in a TYPE 11 data stream.

FIG. 7 illustrates a queue of colors for a block containing several colors N, P, R, S and T, some of which are "transparent" with regard to the corresponding block of pixels in the previous video frame. The circled pixel colors are those pixels whose color is the same as in the previous frame. In the pixel block after compression, these reoccurring pixels are left blank with a o symbol to represent their "transparent" or zero value. In the illustrated example, the remaining occurrences of the colors N, P and T are at pixel locations corresponding to those in the previous frame. Thus, these three colors effectively disappear as transparent colors, and no specific information regarding the colors N, P and T need be stored for this pixel block. Although colors R and S reoccur at several old pixel locations, these two colors also occur at several new pixel locations as well. Therefore, this pixel block will be coded in a TYPE 11 data stream, albeit no additional colors appear in block, because two colors appear at several pixel locations different from their locations in the previous frame in the block. As noted earlier, the "transparent" colors relative to the previous frame are preferably considered as a separate discrete color. Therefore, TYPE 11 coding and not TYPE 10 coding is required for the pixel block in this instance.

As discussed earlier, the determined color values ($C_x$) can have R, G and B components. FIG. 8 illustrates two color values $C_0$ and $C_1$ in RGB space. The location of the color values in RGB space are thus defined by the R, G and B values of the pixels. In this illustration, color value $C_1$ represents the color value of a pixel in the current frame, and the color value $C_0$ represents the color value of the corresponding pixel in the previous video frame. Of course, this illustration is also applicable to the determination of comparatively close colors as shown in FIG. 4c. The difference or distance between the color values of the pixel can be determined in accordance with the following equation:

$$d = \sqrt{X^2(R_1 - R_0)^2 + Y^2(G_1 - G_0)^2 + Z^2(B_1 - B_0)^2}$$

where X, Y and Z are weighted coefficients which can be adjusted to arrive at varying degrees of closeness between color values as desired. Different values for the coefficients X, Y and Z can be used to give greater or lesser emphasis on a particular color component. Thus, the distance between pixel color values $C_0$ and $C_1$ in RGB space may be used to determine their relative closeness when coding color video data.

The compressive storage technique described above can be used in conjunction with personal computers as shown in FIG. 9. Personal computers such as those incorporating a 486-type or other microprocessor can be used to code and decode the color video data. The microprocessor 21 can store the color values, FIFO buffer and look-up tables in its random access memory (RAM) 22 as it identifies and counts the colors in a block of pixels. The video data can be provided by an I/O device 35 and viewed on a video monitor 40. The microprocessor 21 then manipulates the data in the RAM 22 in accordance with the coding process as discussed earlier. After the number of different color values in the pixel block have been reduced to less than four, the remaining colors of the pixel block are coded in an appropriate data stream and stored in a high density storage medium such as the CD-ROM 30. The reduced data stream can later be read at the fixed frame rate of the CD-ROM 30 so as to achieve a smooth video playback in real time on the color monitor 140. Any compatible microprocessor 121 with random access memory 122 can decode this data stream from the CD-ROM 30. It is understood that separate or different microprocessors 21 and 121 can be used to code and decode the data stream. Utilizing such hardware in accordance with the teachings of the invention is within the ordinary level of skill found in the art.

While several forms of the invention have been illustrated and described, it will also be apparent that various modifications can be made without departing from the spirit and scope of the invention. Accordingly, it is not intended that the invention be limited except by the appended claims.

I claim:

1. A method of compressing color video data defining color video frames on a display device, the method comprising the steps of:

providing a color video frame comprising a plurality of pixels, each pixel having an associated color;

dividing the color video frame into blocks of pixels;

comparing the colors present in one of the blocks with the colors in a corresponding block in a previous adjacent block;

determining the number of colors present in the block, the number of colors present in the block determined to be zero where the difference between the colors present in the block and the colors in the corresponding block is less than a predetermined threshold value;

sorting the determined colors present in the block by frequency of occurrence of each color;

comparing each of the determined colors to each other determined color;

ascertaining comparatively close colors from the comparison of each determined color in accordance with the threshold value;

substituting the more frequently occurring color for the less frequently occurring color of two comparatively close colors;

storing color data representative of each pixel in the block in accordance with the number of colors remaining in the block, including assigning a type parameter to the block of pixels, the type determined by the number of colors remaining the block;

determining the number of color words necessary to define the number of colors remaining in the block from the type parameter; and assigning bit values representative of the colors remaining in the block to the color words.

2. The method of claim 1, wherein the step of assigning bit values representative of the colors remaining in the block to the color words comprises the steps of:

comparing the color to be stored to colors stored in a buffer;

assigning a selected bit value to a selected bit in the color word if the color is already stored in the buffer; and assigning bit values representative of the location of the color in the buffer to the remaining bits in the color word.

3. The method of claim 2, further comprising the steps of:

comparing the color to be stored to a list of selected colors if the color to be stored is not already stored in the buffer; and adding the color to be stored to the buffer if the color to be stored is determined to be one of the colors in the list of selected colors.

4. The method of claim 2, further comprising the steps of determining the number of pixel words required by the type parameter;

assigning bit values representative of pointers to particular bit values of the color words to the pixel words;

constructing a data record for the block of pixels comprising a type bit representative of the type parameter followed by the determined number of color words and the number of determined pixel words.

5. The method of claim 1, further comprising the steps of:

determining the number of pixel words required by the type parameter;

assigning bit values representative of pointers to particular bit values of the color words to the pixel words;

constructing a data record for the block of pixels comprising a type bit representative of the type parameter followed by the determined number of color words and the number of determined pixel words.

* * * * *

UNITED STATES PATENT AND TRADEMARK OFFICE
CERTIFICATE OF CORRECTION

PATENT NO. : 6,373,890 B1
DATED : April 16, 2002
INVENTOR(S) : Kyle G. Freeman

It is certified that error appears in the above-identified patent and that said Letters Patent is hereby corrected as shown below:

<u>Title page,</u>
ABSTRACT,
Line 9, change "withing", to -- within --.

<u>Column 14,</u>
Line 8, after "remaining", add -- in --.

Signed and Sealed this

Eighteenth Day of June, 2002

*Attest:*

*Attesting Officer*

JAMES E. ROGAN
*Director of the United States Patent and Trademark Office*